J. Harris.
Water Wheel.
Nº 31,239.    Patented Jan. 29, 1861.
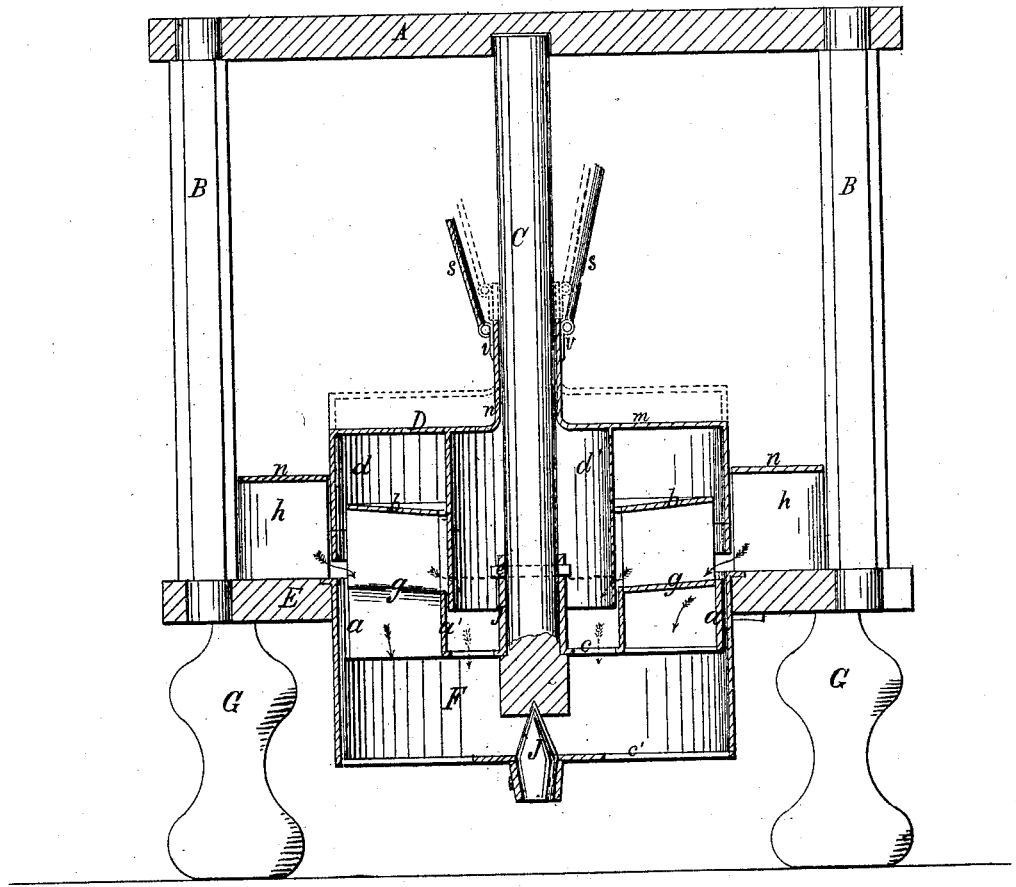
Witnesses.    Inventor

UNITED STATES PATENT OFFICE.

JOEL HARRIS, OF NEW CARLISLE, INDIANA.

WATER-WHEEL.

Specification forming part of Letters Patent No. 31,239, dated January 29, 1861; Reissued August 20, 1872, No. 5,034.

*To all whom it may concern:*

Be it known that I, JOEL HARRIS, of New Carlisle, in the county of St. Joseph and State of Indiana, have invented a new and useful Improvement in Water-Wheels; and I do hereby declare that the following is a full, clear, and exact description thereof, reference being had to the accompanying drawing, making a part of this specification, in which the figure is a vertical central section.

The nature of this invention consists in combining a compound vertical gate, with the water wheel and curved water guides. By means of the said compound gate the capacity of the wheel may be increased or diminished more rapidly, by allowing a greater or less surface of the buckets to be acted upon, after the gate is raised above a certain height by increasing or diminishing the extent of the "issue" or "vent," whereby the action of the "governor" of water wheels, is rendered more sensitive and efficient in regulating the wheel to the varying amount of power required.

To enable those skilled in the art to make and use my invention I will proceed to describe its construction and operation having reference to the drawing.

The tub F, and the deflecting plates or water guides $h$, are constructed and arranged in the same manner that they are in ordinary water wheels of this character, and they are fixed to the bed-plate E, (by bolts or otherwise.) This bed-plate E, rests on four posts G. The water guides $h$, are attached at the top to the annular plate $n$. The wheel J, is made similar to the ordinary turbine water wheels except that the upper half of the inner vertical ring $a$, is removed, thereby providing a central opening or discharge from the buckets $g$, when the gate is raised sufficiently high.

The wheel J, is rigidly attached to the upright shaft C, by means of the key $e$, passing through the hub of the said wheel, and the shaft; said shaft C rests at the lower end upon the step or center J', in the bottom of the tub F and has its axis at the top in the beam A, which is framed to the posts or stanchions B; the lower end of said posts are framed into the bed plate E.

I attach the secondary or inner gate $d'$, to the disk $m$, and in the same manner that the first or outer gate $d$, is attached which may be by bolts or rivets.

The outer gate $d$, shuts down upon the top of the tub F between the water guides $h$, and the buckets $g$, of the wheel and the inner or secondary gate $d'$ shuts down inside of or between the buckets, and the shaft C.

When the gates are raised the outer one $d$, rises about half way before the gate $d'$, begins to open, it being so much longer vertically than the other gate, and when they are raised as shown by the red lines, a portion of the water is allowed to flow through into the center of the wheel as shown by the red arrows,—after acting upon the vertical portion only of the buckets $g$, the balance passing down against the oblique part of them, and discharges at the bottom of the wheel.

The bottom of the wheel within the vertical rings $a'$, is perforated or provided with arms as seen at $c$, and the bottom of the tub F is also perforated or provided with arms as seen as $c'$.

The gates are suspended by the cords $s$, which may be attached to a lever above the beam A or to a governor.

It will be seen that only so much of the vertical portion of the buckets $g$, will be acted upon by the water, as is exposed by the height to which the outer gate $d$, is raised.

What I claim as new and desire to secure by Letters Patent is,

The combination of a compound vertical gate D, with the water wheel J, and deflecting plates or water guides $h$, the whole being constructed, arranged, and operating in the manner and for the purpose specified.

JOEL HARRIS.

Witnesses:
 A. N. DEACON,
 JESSE OGLESBY.